March 8, 1949.  F. J. KENT ET AL  2,463,882
RECORDER AND MECHANICAL MOVEMENT
Filed April 23, 1948  4 Sheets-Sheet 1

INVENTORS
FREDERICK J. KENT
FLOYD V. WILKINS
BY
Fisher & Christen
ATTORNEYS

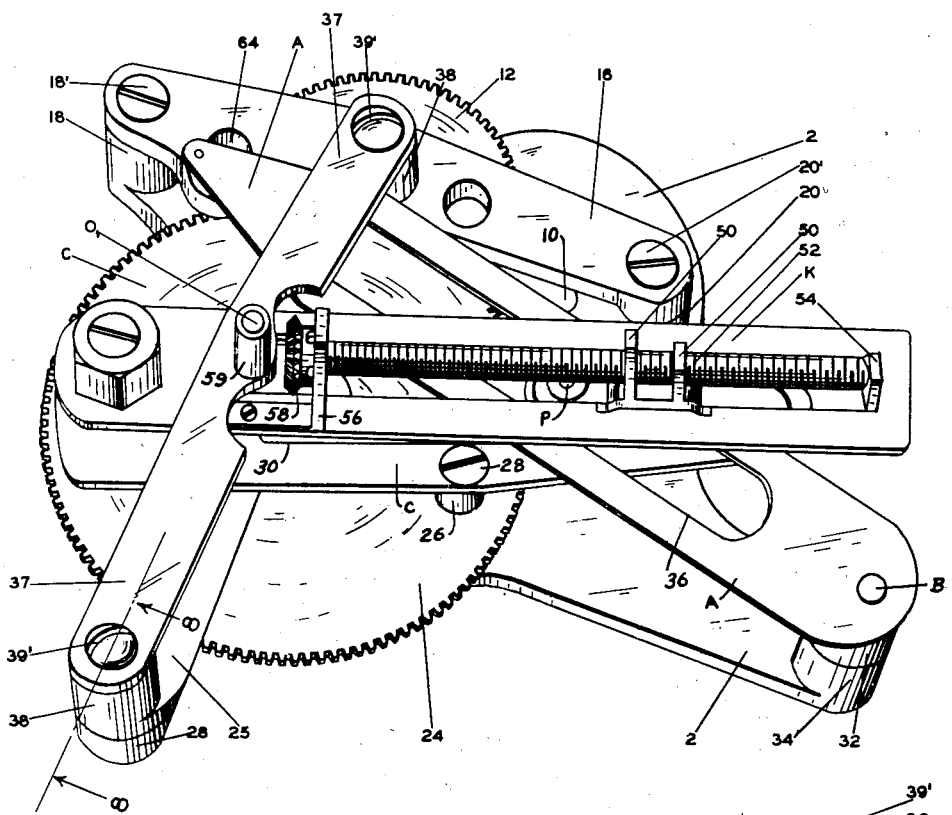
FIG. 2
FIG. 9
FIG. 8
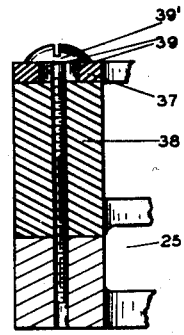
INVENTORS
FREDERICK J. KENT
FLOYD V. WILKINS
BY Fisher & Christen,
ATTORNEYS March 8, 1949.   F. J. KENT ET AL   2,463,882
RECORDER AND MECHANICAL MOVEMENT
Filed April 23, 1948.   4 Sheets-Sheet 3

INVENTOR.
FREDERICK J. KENT
FLOYD V. WILKINS
BY

Fisher & Christen,
ATTORNEYS

March 8, 1949.　　　　F. J. KENT ET AL　　　　2,463,882
RECORDER AND MECHANICAL MOVEMENT
Filed April 23, 1948　　　　　　　　　　　　4 Sheets-Sheet 4

INVENTOR
FREDERICK J. KENT
FLOYD V. WILKINS
BY
Fisher & Christen
ATTORNEYS

UNITED STATES PATENT OFFICE 2,463,882

RECORDER AND MECHANICAL MOVEMENT

Frederick J. Kent, Glen Rock, and Floyd V. Wilkins, Packanack Lake, N. J., assignors to Servo-Tek Products Company, Paterson, N. J., a corporation of New Jersey Application April 23, 1948, Serial No. 22,788

18 Claims. (Cl. 74—96)

This invention is a recording instrument wherein variable readings of a field instrument are transmitted to a rotary motor to rotate that motor an amount proportional to the value of the reading transmitted thereto, the instrument translating such quantitative rotary movements of the motor into corresponding linear values which are recorded by the instrument.

This translation of a given amount of rotary movement into a proportionate linear movement also involves a novel mechanical movement, capable of other uses than in a recording instrument.

The principal object of the invention is to provide a recording instrument or mechanical movement comprising a system of cooperating and interrelated pivoted arms or levers, whereby a given amount of rotary movement is translated into a corresponding linear value.

Another important object of the invention is to provide an instrument where the range or ratio of translation of rotary values into linear values may be varied, so that a very small amount of rotary movement from the field instrument may be amplified sufficiently to give a linear deflection of desired amplitude, or where a relatively large amount of rotary movement from the field instrument may be reduced to give a linear deflection of desired amplitude so as to keep the corresponding linear values within the operating range of the instrument.

More particularly, the invention comprises a prime mover arm which is pivoted, and is geared and driven by a rotary receiving motor of the synchro (often referred to as Selsyn) type to move in an arc directly proportional to the amount of movement of such synchro. This first or prime mover arm is operatively connected to a pivoted output arm, to the outer end of which is connected some recording device, such as a stylus.

Both the prime mover and output arms are slotted, and they are operatively connected by a fulcrum which is slidable in the slots of both of said levers as the arms move.

With only the two arms just described, a given movement of the prime mover arm would deflect the output arm a certain amount, corresponding to the sine of the angle of deflection, whereas the output arm should be deflected a greater amount, namely by an amount corresponding to the length of the arc corresponding to the angle of deflection.

The necessary correction is achieved by a third pivoted or compensating arm, which carries said connecting fulcrum, causing the fulcrum, when the arms are moved, to move in an arc about the pivot of said compensating arm as a center. The pivot for the prime mover arm is positioned between the pivot of the compensating arm and the pivot of the output arm. These pivots are in the same plane.

As a result of this arrangement, when the prime mover arm is deflected a certain amount by the synchro, the compensating arm, by reason of its control of the path of movement of the actuating fulcrum, causes the output arm to be deflected a greater amount, to give a value that is substantially the desired linear value, closely proportional to the amount of rotary movement of the receiving motor.

For example, for a 30° deflection of the prime mover arm, the error in the position of the output arm would be about 4.7% too small, and the compensating arm acts, by its control of the fulcrum, to cause the output arm to be moved 4.7% further, for neutralizing this error.

Where the deflection of the prime mover arm is 60° for example, the error in the position of the output arm is such that it should be increased by approximately 21%, and the compensating arm therefore acts to cause the output arm to be moved 21% farther out, for neutralizing this error.

In other words, the error from 0 degrees to 60 degrees varies from 0 to about 21%. However, the compensating arm serves to correct this error, to give deflections for the output arm which for all angles less than 60° are in error by less than ½ of 1%, an accuracy which is sufficient for all practical purposes, and which is usually within the range of error of the instrument whose readings are transmitted to the rotary receiving motor.

The invention will now be described in more detail in connection with the accompanying drawings wherein:

Fig. 2 is a perspective view of the essential parts of the recorder mechanism.

Fig. 8 is an enlarged vertical section on line 8—8 of Fig. 2.

Fig. 9 is a side view of a tool used in adjusting the recorder mechanism.

Principle of operation

Figure 1:
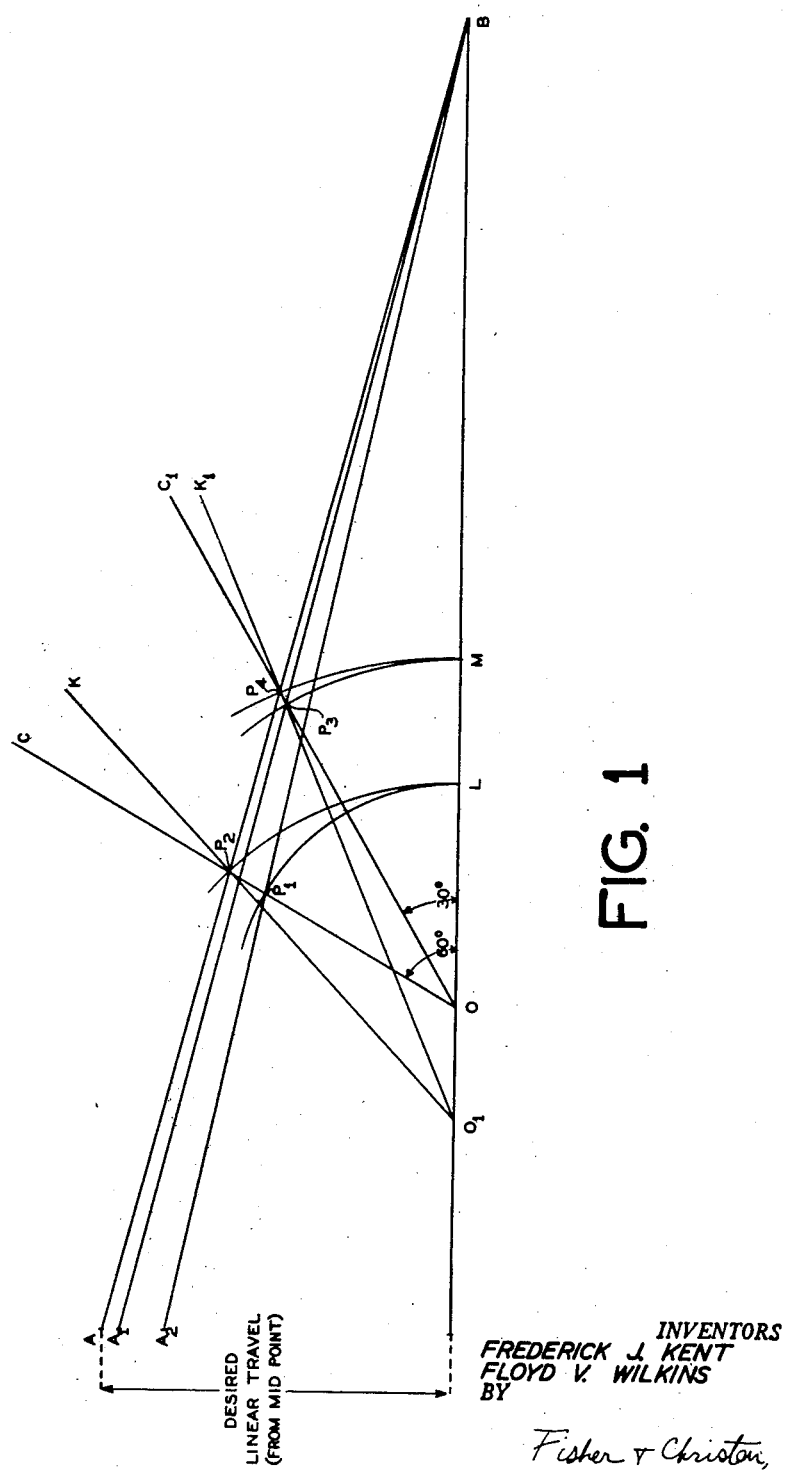
Fig. 1 is a diagram illustrating the principle of operation of the recorder of the present invention.

Referring to Fig. 1, output arm A is pivoted at B, its other or outer end being connected to actuate a pen, pointer or other indicator. Prime mover arm C is operatively connected with a receiving synchromotor, and is deflected an amount proportional to the movement of this receiving motor. A sending synchrogenerator, located at a distance, is connected with a suitable field instrument, or device, for responding to the variable readings of such instrument, such as pressure, temperature, position, fluid flow, etc., and for transmitting electrical values to the receiving synchro, proportional to such variable readings. Such arrangements of synchromotors are well known.

In order to translate the angular or rotary movements of the receiving synchro into accurate linear values for recording purposes, the receiving synchro is geared to actuate this prime mover arm C, which is pivoted at O. This arm C slidably engages with and actuates a pin or fulcrum P, various positions of which are shown at $P_1$, $P_2$, $P_3$, $P_4$, L, M, as will be explained. This fulcrum P slidably engages and actuates output arm A. Fulcrum P—and this feature is very important—is carried by a compensating arm K, pivoted at $O_1$ and so moves in an arc about $O_1$, as a center. To summarize this action:

Fulcrum P is actuated by prime mover arm C.
Fulcrum P actuates output arm A.
Fulcrum P is carried by and therefore its position is controlled by compensating arm K.

Compensating arm K is pivoted at $O_1$. Distance $O_2$—O is approximately 36% of distance $O_1$—L, this being the length of compensating arm K as determined by the fulcrum P when adjusted for 60° travel. It is important that the actual pivotal axes O, $O_1$, and B be located in the same plane.

The variable readings of the field instrument received by the synchromotor vary in amplitude. Where the amplitude is small, it is desirable to have a high ratio of transfer or step-up from arm C to output arm A, so that the relatively small values will give a readable deflection of output arm A. Conversely, where the amplitude is large, it is desirable to have a low ratio of transfer or step-down from arm C to the output arm A.

Such results are achieved as shown in Fig. 1 by positioning point P nearer or farther from pivot B. Fig. 1 illustrates a low and medium ratio transfer from arm C to output arm A. Each of the positions shown are for an assumed deflection of arm C. In actual practice, the ratio is chosen so that the deflection of A is only about 6° for maximum travel. Due to the length of arm A, sufficient deflection is had at its outer end, which is connected to actuate a recording stylus.

For a low transfer ratio, where arm C must move a large angular amount, such as 60° about center, the fulcrum P would be at point L. Without compensation arm C would move in arc L—$P_1$, the fulcrum arriving at $P_1$ giving an uncorrected position $A_2$ for the output arm. Point $P_1$ would be in error, and for this 60° position should have caused arm A to move approximately 21% further.

This error is compensated for by arm K, which carries the fulcrum to a point $P_2$, through arc L—$P_2$. This gives corrected position A for the output arm.

For a medium ratio transfer (where a 30° travel of the prime mover arm C would effect the desired full travel of the output arm) the fulcrum P, starting at M, if uncorrected would arrive at $P_3$. This would locate the output arm at $A_1$, for its uncorrected position. However, when compensated, the arm K would cause the fulcrum to move in arc M—$P_4$. The fulcrum P would arrive at $P_4$, arm K assuming position $O_1K_1$ thereby increasing the movement of the output arm A by the approximate 4.7% required. This gives corrected position $BP_4$ for the 30° deflection, which is substantially coincident with the $BP_2$ position for the 60° deflection already described.

Proper positioning of pivot point $O_1$ with respect to O, will allow compensation to such a degree that the corrected position of arm A will be accurate within ½ of 1%, an amount well within practical operating limits.

Referring now more particularly to the preferred construction as shown in the other figures, the apparatus comprises a base plate 2, having a flange 4 on its underside into which is fitted the upper part of a synchromotor 6. This synchromotor is connected to a sending synchrogenerator which transmits to the receiver 6 variable values from a field instrument, which values are to be recorded by the present recorder. Such variable values may be, for example, temperature, pressure, position, fluid flow, idle and operating periods for machines, etc.

The rotor of the receiving motor 6 has its shaft 8 extended upwardly through the base plate and is provided with a pinion gear 10 which meshes with gear 12. The shaft 14 of gear 12 is mounted at its lower end in the base plate and at its upper end in cross bar 16; this cross bar 16 is mounted on top of two upwardly extending studs 18 and 20 carried by and preferably integral with the base plate being secured thereto by screws 18' and 20'.

Figure 7:
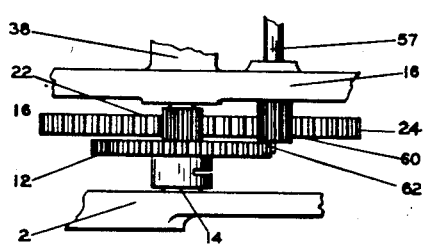
Fig. 7 is an enlarged view of gears in the lower part of Fig. 3.

Shaft 14 forming part of pinion 22 is frictionally fitted into gear 12, Fig. 7. The friction fit of gear 12 on its shaft is to enable the gear to be turned with respect to its pinion for setting the instrument in zero or neutral position, as will be explained later.

Small spur gear 22 meshes with and drives a large gear 24, conveniently termed a prime-mover gear. This gear 24 is mounted on shaft O, the axis of which corresponds to pivot O on Fig. 1. The lower end of shaft O is mounted in the base plate, while the upper end is mounted in a cross bar 25; one end of bar 25 is carried by and conveniently integral with cross bar 16, while its other end is seated on top of upwardly extending stud 28, carried by the base plate.

The prime mover gear 24 has secured thereto, and so actuates, a prime mover arm C, corresponding to arm C of Fig. 1. This mounting is effected by hollow stud 26 secured to the top of gear 24 and screws 28 passing through arm C into the studs. Arm C therefore moves with gear 24 about shaft or point O as a center.

Prime mover arm C is slotted, as at 30, and its essential function is to move the output recording or pen arm A, corresponding to arm A of Fig. 1. Output arm A is pivotally mounted on pivot B corresponding to pivot point B Fig. 1, and is mounted to move back and forth in a horizontal plane just above arm C. Arm A is conveniently mounted by securing it to a stud 32, which is pivoted on pivot pin B mounted in a stud 34 extending up from base plate 2. Arm A is slotted, as at 36, for receiving and actuating fulcrum, indicating generally P, which corresponds to point P of Fig. 1.

Movement of prime mover arm C is transmitted to output arm A by this connecting fulcrum P. Pin P is slidable in slot 30 of arm C and is also slidable in slot 36 of arm A. Pin or fulcrum P is carried by compensating arm K, corresponding to arm K of Fig. 1. This arm K and its positioning and function are very important features of the present invention. The pivot $O_1$ of arm K is positioned to the left of axis O of arm C such that distance $OO_1$ is 36% of the distance $O_1L$, Fig. 1. The pivots O, $O_1$ and B are in the same plane.

The pivot $O_1$ of arm K is carried by a cross arm 37, positioned on top of studs 38 projecting up from cross bar 16 and bar 25. The exact positioning of pivot $O_1$ is important and in order to enable it to be precisely adjusted, the arm at each end is provided with enlarged holes 39, Fig. 8 through which pass screws 39', having heads the undersides of which are flat and considerably larger than the threaded holes in studs 38 into which the screws are threaded. This enables the cross arm 37 to be moved a small distance longitudinally or transversely, so that $O_1$ can be precisely located. This is done at the factory, and when the arm 37 is exactly positioned, screws 39' are sealed or soldered in place permanently.

In order to minimize friction, pin or fulcrum P is provided with a ball bearing roller 40, which engages in slot 30 of arm C and with a concentric ball bearing roller 42, just above it, which engages in slot 36 of arm A.

Pin P is carried by a slide plate 44, slidable along the underside of arm K. Plate 44 carries a stud 46, which passes up through slot 46 in arm K and engages in an arched bridge plate 48, which straddles slot 46 and is provided with downwardly extending flanges 49 engageable in the slot.

Stud 46 carries an index member 50, approximately U-shaped, the two arms of which are threaded and engage with a threaded shaft 52. Shaft 52 is journaled in outer and inner upstruck flanges 54 and 56, projecting up on the top side of arm K. The inner end of shaft 52 is provided with a bevel gear 58, for engagement with a similarly geared tool for turning it. Such tool 57, shown in Fig. 9, carries bevel gear 58', and is hollow at one end to slip over a vertical stud, formed by a cylindrical collar or sleeve 59 surrounding pivot $O_1$, Fig. 2.

Index member 50 is arranged to project upwardly through a slot in a top face plate 51 the edges of the slot are calibrated as at 50' in terms of ratio transfer, so that the user, by positioning index 50 alongside the proper calibration, can readily ascertain and set the index for the desired ratio transfer, in accordance with the amplitude of the variables being received and recorded.

To summarize the action of pivot or fulcrum P:

1. It moves in an arc about $O_1$ as center.
2. It is actuated by prime mover arm C.
3. It can and does slide a small amount with respect to arm C in slot 30 of arm C.
4. It can and does slide a small amount with respect to output arm A in the slot 36 of arm A.
5. It is normally fixed, but is variably positionable by threaded shaft 52, toward pivot B to give a greater deflection to output arm A, or away from pivot B to give a lesser deflection, in accordance with the amplitude of the variable readings received by the receiving synchro or Selsyn motor 6. Once calibrated for the variables being received in a particular installation, it normally remains fixed at that point.

Figure 3:
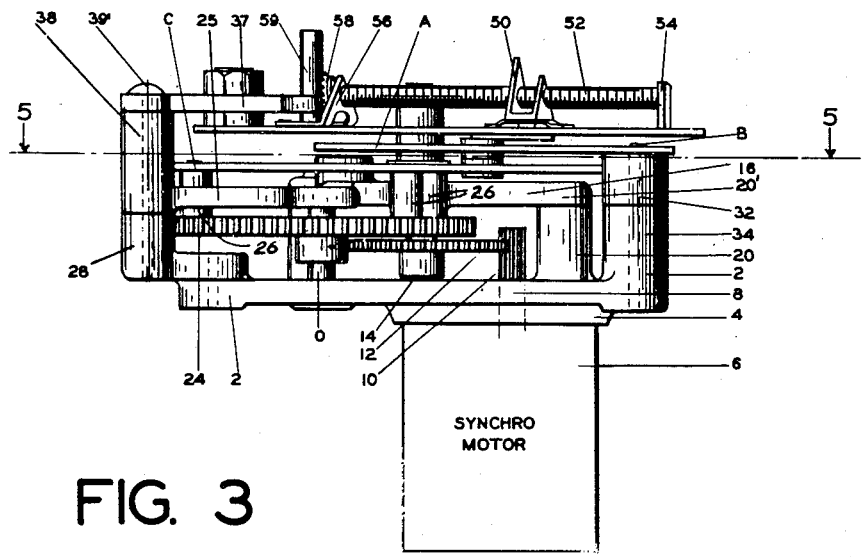
Fig. 3 is a side view of the recorder mechanism.
Figure 4:
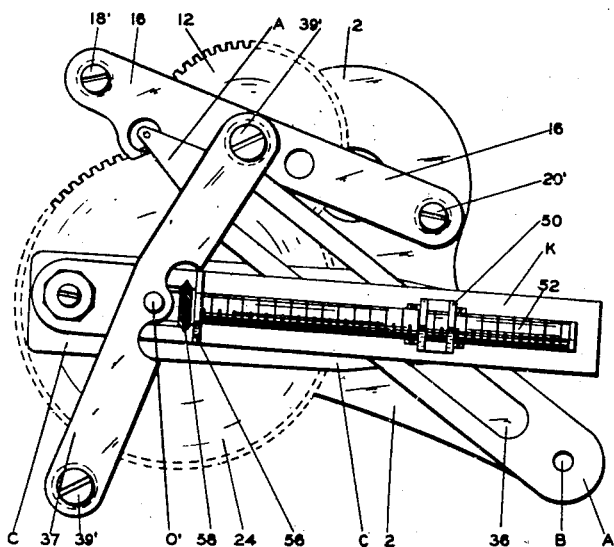
Fig. 4 is a top view of the same.
Figure 5:
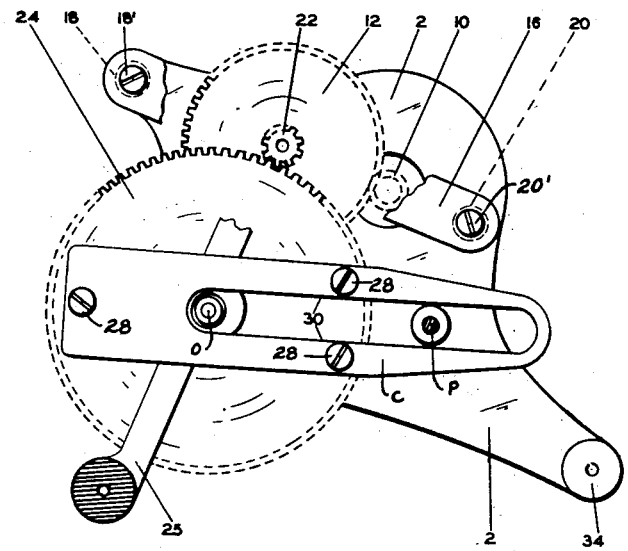
Fig. 5 is a section on line 5—5 of Fig. 3, parts being broken away to show certain elements on a lower level.
Figure 6:
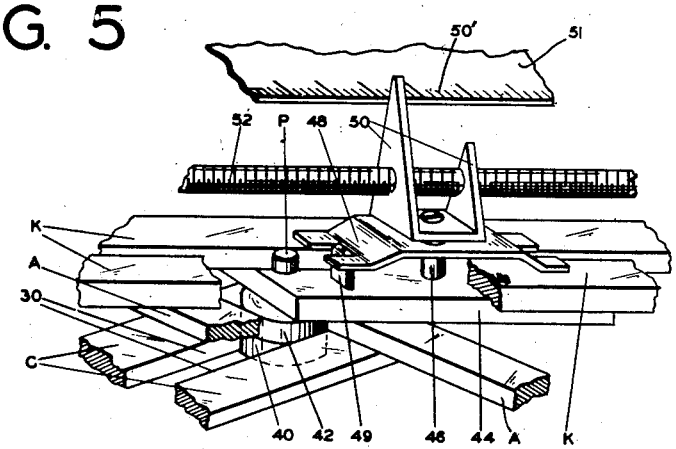
Fig. 6 is an enlarged perspective view of a detail.

The tool 57 of Fig. 9 is used for turning threaded shaft 52 for variably positioning fulcrum P in accordance with the amplitude of the variables or readings that the recorder is to receive. As explained in paragraph 5, above, where the amplitude is small, point P is moved toward point B of the output arm. The nearer point P is to B, the greater the deflection of arm A for a given angular movement of prime mover arm C; conversely, the farther away point P is from B, the lesser the deflection of A for a given angular movement of the prime mover arm C. This calibration or setting of point P is usually done on the job, in accordance with the amplitude of the values being received. This is done with tool 57, Fig. 9, which is slipped over stud 59, Fig. 3, so that gears 58 and 58' are engaged, the tool being turned by the fingers using gear teeth 60 for that purpose. This turns threaded shaft 52, which moves index member 50, Figs. 1 and 6, bridge member 48 and fulcrum or point P.

Tool 57 is also provided with a pin 62 projecting from one end, adapting it for another use; when the instrument is installed, the output arm A should be in zero or neutral position, when the sending synchro is at zero. In the event it is not at zero or neutral position, tool 57 is dropped through a hole 64 in cross bar 16, so that gear teeth 60 on the tool, see Fig. 9, engage the teeth of large gear 24, with pin 62 on the tool engaged between two teeth of gear 12. Pin 62 locks gear 12 against rotation. Now if the tool is turned, large gear 24 is turned and this tends to turn gear 22 meshed therewith. But since gear 12 is locked by pin 62, shaft 14 on which it is fixed can turn together with gear 22. As already explained, gear 12 has a fairly tight friction fit on shaft 14. The tool is now turned by hand with considerable force, which moves gear 24 and gear 22, to give the desired zero or neutral setting. This does not move gear 12, which is locked by pin 62, but it does move gear 24, which actuates the prime mover arm C, and so the zero reading of the synchro 6 is not changed.

As already noted, the left hand end of output arm A is connected to any suitable recording device, such as a marking stylus, movable in the usual way over a slowly moving graph or chart, usually driven by clockwork or the like, in either a linear or circular path. A spring is preferably used to put a very slight tension on the stylus, to eliminate any error due to possible back lash.

The mechanical movement illustrated herein, while particularly for use in a recorder as described, may be capable of other uses, for translating rotary or angular values into corresponding linear values.

While the invention has been described in considerable detail, it should be understood that the invention is not to be limited to the precise details shown, but may be carried out in other ways.

We claim as our invention:

1. A recording device, comprising a pivoted output arm, a pivoted prime mover arm operatively connected with and responsive to the readings of a field instrument, a pivotal connection movable longitudinally with respect to the prime mover arm and also movable longitudinally with respect to said output arm for operatively connecting the prime mover arm and the output arm, and a pivoted compensating arm for carrying said pivotal connection and for moving said pivotal connection in an arc about the pivot of said compensating arm as a center.

2. A recording device, comprising a pivoted output arm, a pivoted prime mover arm, operatively connected with and responsive to the readings of a field instrument, a pivotal connection movable longitudinally with respect to the prime mover arm and also movable longitudinally with respect to said output arm, for operatively connecting the prime mover arm and the output arm, and a pivoted compensating arm for carrying said pivotal connection and for moving said pivotal connection in an arc about the pivot of said compensating arm as a center, the three respective pivots for the output arm, the prime mover arm, and the compensating arm, being in the same plane, with the pivot for the prime mover arm between pivots for the other two arms, whereby, for a given deflection of the prime mover arm, the output arm is caused to move through a larger angle than would be imposed by movement of the prime mover arm alone.

3. A recording device, comprising a pivoted output arm, a pivoted prime mover arm operatively connected with and responsive to the readings of a field instrument, a pivotal connection movable longitudinally with respect to the prime mover arm and also movable longitudinally with respect to said output arm for operatively connecting the prime mover arm and the output arm, a pivoted compensating arm, for carrying said pivotal connection, and for moving said pivotal connection in an arc about the pivot of said compensating arm as a center, and means for variably positioning and setting said pivotal connection at any desired position on said compensating arm, whereby the deflections of the output arm may be kept within a desired operating range, in accordance with the magnitude of the variables being recorded and whereby its deflections within that range are corrected by said compensating arm.

4. A recording device, comprising a pivoted output arm, a pivoted prime mover arm operatively connected with and responsive to the readings of a field instrument, a pivotal connection movable longitudinally with respect to the prime mover arm and also movable longitudinally with respect to said output arm for operatively connecting the prime mover arm and the output arm, and a pivoted compensating arm for carrying said pivotal connection, and for moving said pivotal connection in an arc about the pivot of said compensating arm as a center, the three respective pivots for the output arm, the prime mover arm, and the compensating arm being in the same plane, with the pivot for the prime mover arm between pivots for the other two arms, whereby, for a given deflection of the prime mover arm, the output arm is caused to move through a larger angle than would be imposed by movement of the prime mover arm alone, and means for variably positioning and setting said pivotal connection at any desired position on said compensating arm, whereby the deflections of the output arm may be kept within a desired operating range, in accordance with the magnitude of the variables being recorded, and whereby its deflections within that range are corrected by said compensating arm.

5. A recording device, comprising a rotary motor operable quantitatively in response to the readings of a field instrument, a prime mover arm driven by said motor, a pivoted output arm for connection to a stylus or the like, an actuating fulcrum operatively connecting and movable longitudinally with respect to said prime mover and output arms, and a pivoted compensating arm for carrying said actuating fulcrum and causing it to move in an arc about the pivot of said compensating arm as a center, for thereby translating rotary movement of said motor into corrected angular movement of said output arm.

6. A recording device, comprising a rotary motor operable quantitatively in response to the readings of a field instrument, a prime mover arm gear driven by said motor, a pivoted output arm for connection to a stylus or the like, an actuating fulcrum operatively connecting and movable longitudinally with respect to said prime mover and output arms, a pivoted compensating arm for carrying said actuating fulcrum, means for variably positioning and setting said fulcrum longitudinally on said compensating arm, for movement therewith, for thereby translating rotary movement of said motor into corrected angular movement of said output arm.

7. A recording device, comprising a rotary motor operable quantitatively in response to the readings of a field instrument, a prime mover arm gear driven by said motor, a pivoted output arm for connection to a stylus or the like, an actuating fulcrum operatively connecting and movable longitudinally with respect to said prime mover and output arms, a pivoted compensating arm for carrying said actuating fulcrum, means for variably positioning and setting said fulcrum longitudinally on said compensating arm for movement therewith, the three respective pivots for the said arms being in the same vertical plane, for thereby translating a rotary movement of said motor into a corresponding corrected angular movement of said output arm.

8. A recording device, comprising a rotary motor operable quantitatively in response to variable readings of a field instrument, a longitudinally slotted prime mover arm driven by said motor, a longitudinally slotted, pivoted output arm for connection to a stylus or the like, an actuating fulcrum movable in the slots of said two arms and operatively connecting them, and a pivoted compensating arm for carrying said actuating fulcrum and causing it to move in an arc about the pivot of said compensating arm as a center, the pivot for the prime mover arm being located between the pivots of the other two arms, for thereby translating any given rotary movement of said motor into a corresponding corrected angular movement of said output arm, readable in corresponding linear values.

9. A recording device, comprising a rotary motor rotatable quantitatively in response to variable readings of a field instrument, a longitudinally slotted prime mover arm driven by said motor, a longitudinally slotted, pivoted output arm for connection to a stylus or the like, an actuating fulcrum movable in the slots of said two arms and operatively connecting them, and a pivoted compensating arm for carrying said actuating fulcrum and causing it to move in an arc about the pivot of said compensating arm as a center, the pivot for the prime mover arm being located between the pivots of the other two arms, a pivoted compensating arm for carrying said actuating fulcrum, means for variably positioning and setting said fulcrum longitudinally on said compensating arm, for movement therewith, for thereby translating any given rotary movement of said motor into a corresponding corrected angular movement of said output arm, readable in corresponding linear values.

10. A variable ratio leverage system for transmitting motion, comprising the combination of a first pivoted arm to which motion is applied, a pivoted output arm to which motion is delivered from said first pivoted arm, an actuating fulcrum operatively connecting said two pivoted arms, a third pivoted arm carrying said actuating fulcrum, and means for variably positioning said actuating fulcrum longitudinally of said third arm.

11. A variable ratio leverage system for transmitting motion, comprising the combination of a first pivoted arm to which motion is applied, a pivoted output arm to which motion is delivered from said first pivoted arm, an actuating fulcrum operatively connecting said two pivoted arms, a third pivoted arm carrying said actuating fulcrum, the pivot for said first pivoted arm being positioned between the pivots of the other two arms, and means for variably positioning said actuating fulcrum longitudinally of said third arm.

12. A variable ratio leverage system for transmitting motion, comprising the combination of a first pivoted arm to which motion is applied, a pivoted output arm to which motion is delivered from said first pivoted arm, an actuating fulcrum operatively connecting said two pivoted arms and slidably engageable with both said arms, a third pivoted arm carrying said actuating fulcrum, the pivot for said first pivoted arm being positioned between the pivots of the other two arms, all of said pivots being in the same vertical plane, and means for variably positioning said actuating fulcrum longitudinally of said third arm.

13. A variable ratio leverage system for transmitting motion, comprising in combination, a torque motor rotatable proportionately in response to varying values, a first pivoted arm, operatively geared to said motor, a pivoted output arm, an actuating fulcrum for operatively connecting said first arm and said output arm, said fulcrum being longitudinally slidable with respect to both of said arms, and a third pivoted compensating arm carrying said actuating fulcrum and serving to move said fulcrum longitudinally with respect to the first pivoted arm and the output arm, when the first arm is moved by the motor, for thereby translating rotary movement of the motor into linear movement values of the output arm.

14. A variable ratio leverage system for transmitting motion, comprising in combination, a torque motor rotatable proportionately in response to varying values, a first pivoted arm geared operatively to said motor, a pivoted output arm, an actuating fulcrum for operatively connecting said first arm and said output arm, said fulcrums being longitudinally slidable with respect to both of said arms, and a third pivoted compensating arm carrying said actuating fulcrum having its pivot located between the pivots of the first pivoted arm and the output arm, and serving to move said fulcrum longitudinally with respect to the first pivoted arm and the output arm, means for variably positioning and setting said fulcrum longitudinally of the compensating arm, for thereby determining the amount of deflection applied to the output arm, whereby the variable rotary movements of the motor are translated into predetermined corresponding linear movement values of the output arm, depending on the setting of said actuating fulcrum.

15. A variable ratio transmission, comprising the combination of a first longitudinally slotted, pivoted oscillatable arm to which motion is applied, a second longitudinally slotted oscillatable arm remotely pivoted from the pivot of said first oscillatable arm, the slots in said arms being adapted to overlap, an actuating stud slidably engageable in both said slots where they overlap for transmitting motion from said first arm to said second arm, a thid pivoted oscillatable arm for carrying said actuating stud, and means for variably positioning said actuating stud longitudinally of said third oscillatable arm, whereby a given angular deflection of said first oscillatable arm gives a corrected angular deflection to said second oscillatable arm.

16. A variable ratio transmission, comprising the combination of a first longitudinally slotted, pivoted oscillatable arm to which motion is applied, a second longitudinally slotted oscillatable arm remotely pivoted from the pivot of said first oscillatable arm, the slots in said arm being adapted to overlap, an actuating stud slidably engageable in both said slots where they overlap for transmitting motion from said first arm to said second arm, a third pivoted oscillatable arm for carrying said actuating stud, and screw threaded means for variably positioning and setting said actuating stud longitudinally of said third oscillatable arm, for thereby varying the ratio of deflection of said second oscillatable arm for a given deflection of said first oscillatable arm.

17. A variable ratio transmission, comprising the combination of a first longitudinally slotted, pivoted oscillatable arm to which motion is applied, a second longitudinally slotted oscillatable arm remotely pivoted from the pivot of said first oscillatable arm, the slots in said arm being adapted to overlap, an actuating stud slidably engageable in both said slots where they overlap for transmitting motion from said first arm to said second arm, a third pivoted oscillatable arm for carrying said actuating stud, means for varying the distance between the pivots of said first and third oscillatable arms, and means for variably positioning said actuating stud longitudinally of said third oscillatable arm, for thereby varying the ratio of deflection of said second oscillatable arm for a given deflection of said first oscillatable arm.

18. A variable ratio transmission, comprising the combination of a first longitudinally slotted, pivoted oscillatable arm to which motion is applied, a second longitudinally slotted oscillatable arm remotely pivoted from the pivot of said first oscillatable arm, the slots in said arm being adapted to overlap, an actuating stud slidably engageable in both said slots where they overlap for transmitting motion from said first arm to said second arm, a third pivoted oscillatable arm for carrying said actuating stud, means for varying the distance between the pivots of said first and third oscillatable arms, and screw threaded means for variably positioning and setting said actuating stud longitudinally of said third oscillatable arm, for thereby varying the ratio of deflection of said second oscillatable arm for a given deflection of said first oscillatable arm.

FREDERICK J. KENT.
FLOYD V. WILKINS.

No references cited.